March 20, 1962     W. M. QUINT     3,025,982
VEHICLE LOADING AND UNLOADING CONVEYOR STRUCTURE
Filed Jan. 13, 1960     2 Sheets-Sheet 1

INVENTOR.
WILLIAM M. QUINT
BY

ATTORNEYS

INVENTOR.
WILLIAM M. QUINT
BY

ATTORNEYS

United States Patent Office 3,025,982
Patented Mar. 20, 1962

3,025,982
VEHICLE LOADING AND UNLOADING CONVEYOR STRUCTURE
William M. Quint, Kent, Ohio
(9362 Page Road, Streetsboro, Ohio)
Filed Jan. 13, 1960, Ser. No. 2,260
6 Claims. (Cl. 214—83.36)

This invention relates to self-unloading vehicles and more particularly to vehicle mounted power driven conveyors for unloading cargo vehicles.

The use of vehicle mounted conveyor mechanisms to shift a load to the rear of a truck bed for convenient unloading has long been considered a desirable method of unloading a truck. The simple flipping of a switch to activate mechanism and cause a load to move to the rear of a cargo bed is a desirable convenience.

Experience has shown, however, that there are many problems to be solved before the flipping of this switch can be a commercial reality. The basic problem, not solved by any of the previous devices, is that of support plate flexure or warpage caused by the weight of the load carried by the vehicle. In light-weight applications a simple "bed-wide" conveyor belt supported at opposite sides of the truck bed is sufficient. Light loads can be supported without warpage or substantial deflection. An endless bed-wide conveyor belt is passed on top of the bed-wide plate, and since the plate is supported only at the side extremities of the bed, the belt can be passed between the bed and the plate. Suitable drive means is used to cause the conveyor to move and carry a load.

As the weight of the load increases, the problems increase. If the load to be moved has substantial weight, then a plate which is supported from the bed only at its side extremities will tend to warp or deflect. A heavy load on the plate will cause it to deflect if the plate is unsupported over any appreciable span, and make the plate inoperative as a support for the conveyor.

The apparent solution to this problem is to use one or more additional support ribs between the truck bed and support plate. This solution raises the problem of an obstructed path of travel for the belt conveyor. A bed-wide belt is free to pass over the top of the plate, but its path of travel between the plate and the bed of the vehicle is obstructed by the supporting members of the plate. This obstruction exists whether the support members extend laterally or longitudinally. To overcome this difficulty it is necessary to pass the belt under the bed. Passing the belt under the bed has the obvious disadvantage of possible entanglement with the vehicle mechanisms that are located beneath the bed.

Therefore, one of the principal objects of this invention is to provide a self-unloading vehicle particularly adapted to handling heavy loads.

A related object of this invention is to provide a self-unloading vehicle having several side-by-side conveyor belts working in concert.

Another object of this invention is to provide a vehicle mounted unloading mechanism having a reinforced support plate for the load.

Still another object of this invention is to provide a vehicle mounted unloading mechanism having a series of side-by-side cooperating conveyors which are contained completely above the bed of the vehicle.

Another object is to provide a self-unloading vehicle having a conveyor capable of moving heavy loads which effectively cover substantially the width of the cargo bed.

Other objects and a fuller understanding of the invention may be had by referring to the following description and claims taken in conjunction with the accompanying drawings, in which:

Figure 1:
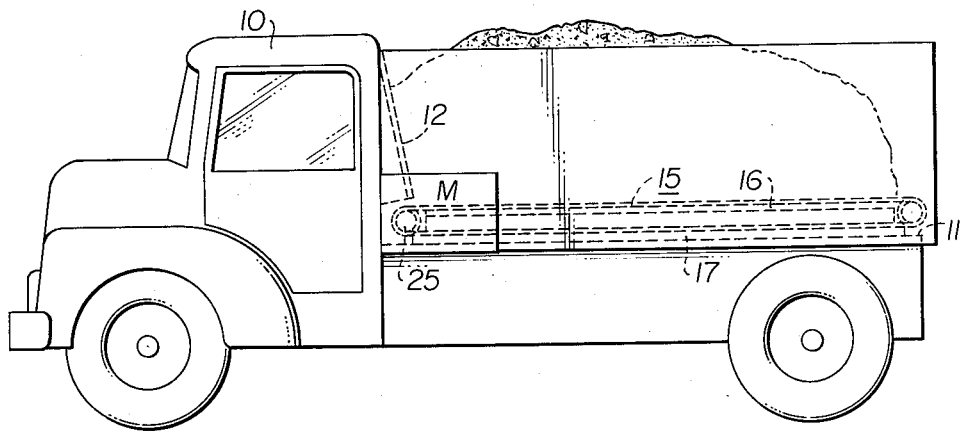
FIGURE 1 is a side elevational view of a truck equipped with a removable accessory version of the unloading device.
Figure 2:
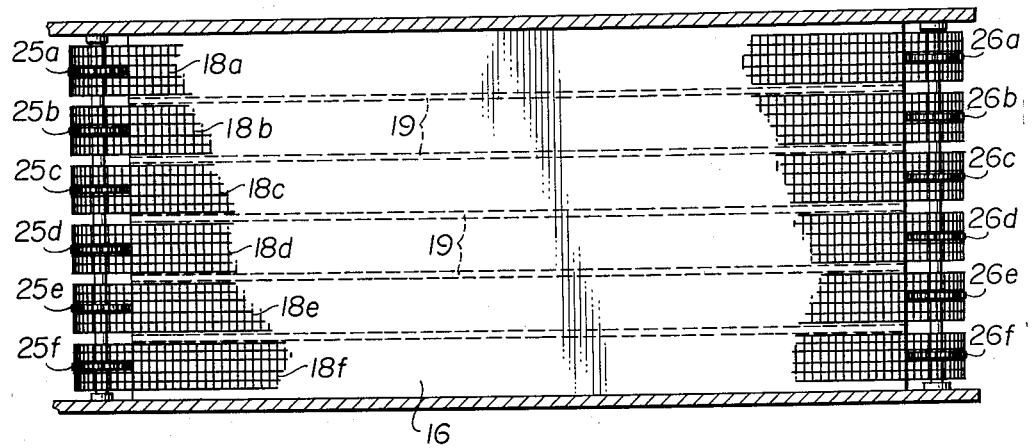
FIGURE 2 is a plan view of an accessory version of the unloading device with the link chain belt shown somewhat schematically.

The unloading device is shown in a typical environment, that of a flat bed truck (see FIGURE 1). The description and explanation of its operation will be orientated to this environment, but the device can be successfully used on virtually all vehicles having a cargo bed, with or without a closed bottom floor.

Referring now to the drawings, a truck 10 is shown having a flat cargo bed floor 11. A conveyor mechanism is provided and is designated generally by numeral 15. The illustrated embodiment is a portable type which can be employed on and removed from the bed.

The mechanism 15 has a load support plate 16 and a base plate 17. Both the plates 16 and 17 are the same size; both are slightly smaller than the cargo bed 11. A plurality of longitudinally extending ribs 19 are welded to the two plates 16 and 17 and hold them in spaced relationship. In the preferred and disclosed embodiment the ribs 19 extend substantially the entire length of the plates 16 and 17. A plurality of channels 20 are defined by the surfaces of the ribs 19, the support plate 16 and the base plate 17.

Several link chain endless conveyor belts 18a, b, c, d, e, f, are provided, and are hereinafter designated collectively as 18. The belts are each supported upon the upper support plate, and each returns in a loop extending through one of the channels 20. The width of each of the belts, 18 is substantially the width of its respective channel 20. In the illustrated embodiment, each channel 20 is of the same size but this is for convenience of construction and equal sized channels are not required.

A plurality of drive sprockets 25a, b, c, d, e, f, are provided at the front end of the bed and a similar number of idler sprockets 26a, b, c, d, e, f, are provided at the rear end of the bed. The front and rear sprockets are aligned. For example; sprocket 25a, is longitudinally aligned with sprocket 26a, and sprocket 25b, with sprocket 26b. Each two of the longitudinally aligned sprockets 25, 26 comprises a pair. Each pair of sprockets engages one of the individual conveyor belts 18 which is trained over each one of the pair of sprockets 25, 26. Each sprocket 25, 26 has teeth 39, which drivingly engage the link chain conveyor belt 18 trained over it. The sprockets 26 are laterally and vertically aligned with each other and drivingly connected to a common shaft 28. Each of the sprockets 25 are similarly aligned and also drivingly connected to a common shaft (not shown). The front shaft is connected to a motor M for driving power. This is for convenience and the rear shaft could be used for power equally effectively.

Figure 3:
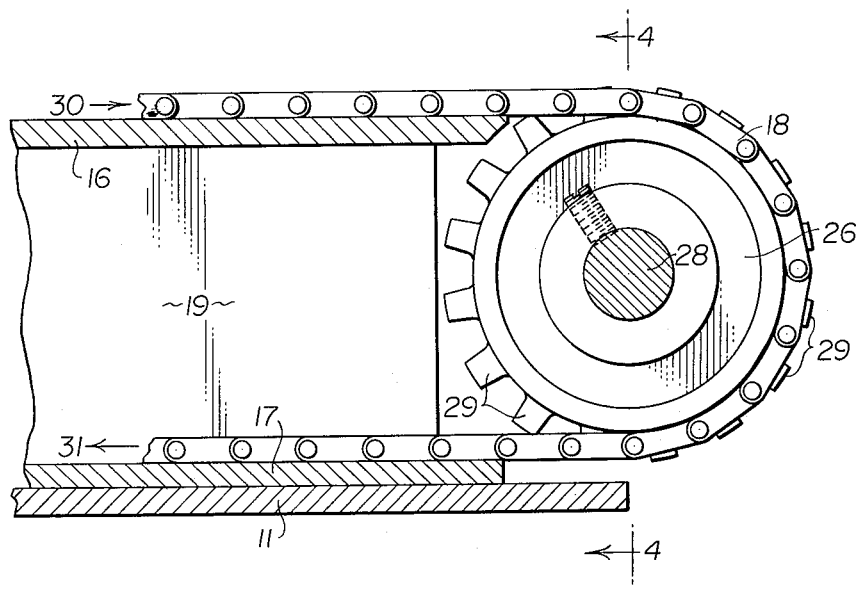
FIGURE 3 is an elevational section view of an end portion of the unloading device; and, FIGURE 4 is a partial section view taken along line 4—4 of FIGURE 3.
Figure 4:
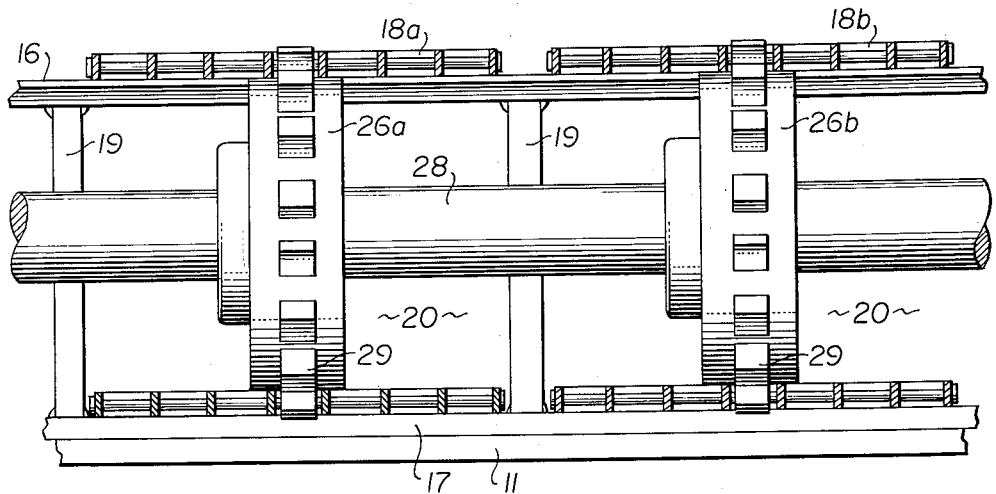

In operation of the device, when the rear sprockets as they appear in FIGURE 3 are driven in a clockwise direction, the upper run, that portion of each chain 18 resting on the support plate 16, will be moved along an upper path of travel 30, toward the rear of the bed, and the lower run, that portion of the chain 18 in the channels 20, will move along a lower path of travel 31, toward the front of the bed. This will cause any load on the support plate to move toward the rear of the bed and as the chain leaves the support plate 16 and loops around a sprocket 26, the load is dropped off the back of the support plate. To move a load to the front of the bed, the motor is reversed and thus the sprockets are rotated in the opposite direction causing the load to move forward toward the front of the bed.

Each of the sprockets 25 is the same size so that when they are rotated by the common drive shaft (not shown), they will move each of the conveyor belts 18 at the same speed. The sprockets 26 are also each of the same size.

In the illustrated embodiment a link chain type of conveyor is used. Commercially, this has proved most desirable.

The illustrated embodiment of the device is a portable type. The device can also be a permanent installation on a truck or the like. In such case, no base plate 17 is required. Each of the ribs 15 is welded to the bottom of the support plate 16 and to the bed of the truck. Thus, the support plate 16 is held in spaced relationship with respect to the cargo bed, and the channels 20 are formed by the support plate 16, the ribs 19, and the bed 11. The conveyor belt is positioned in the channels 20 in the same way it is positioned in the channels 20 of the portable device.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A loading and unloading device suited to be mounted on the cargo bed of a vehicle comprising a support plate substantially coextensive with said bed, a plurality of longitudinally extending transversely spaced support ribs vertically spacing said plate from the bed, said ribs rigidly interconnecting said plate and said bed, a plurality of closely spaced side-by-side endless conveyor belts, said belts being transversely disposed across said bed with each belt extending substantially the length of the bed, a portion of each of said belts supported by said plate, a portion of each of said belts being positioned between said plate and said bed, each belt extending laterally substantially from one rib to the next adjacent rib, and a common drive means drivingly connecting each of said conveyor belts.

2. In a vehicle having a cargo bed, the combination with said vehicle of a vehicle mounted unloading mechanism substantially coextensive with said bed, said unloading mechanism comprising a plurality of closely spaced side-by-side endless conveyor belts each extending substantially the entire length of the bed, said belts being transversely disposed across the width of said bed with the width of each belt being substantially greater than the space between any two belts, a support plate, said support plate being substantially the same size as the bed, a plurality of longitudinally extending transversely spaced ribs holding said plate vertically spaced from and superposed with respect to the bed, a pair of sprockets carrying each of said conveyor belts, said sprockets being mounted at the front and back portions of said bed, each of said conveyor belts having its upper run supported by said plate and its lower run between said plate and said bed, each portion of said belts between said plate and said bed extending substantially between two adjacent ribs, and a common drive shaft drivingly interconnecting each pair of sprockets to the other parts, whereby when the shaft is rotated each belt will move simultaneously and at the same speed and the system thus approximating a single belt.

3. In a truck having a flat cargo bed, the combination with said truck of an unloading mechanism, said mechanism comprising a support plate substantially coextensive with said bed, a plurality of laterally spaced support ribs connected between said bed and said support plate for rigidly supporting said plate above said bed, said ribs extending substantially from one end of said bed to the other, a plurality of closely spaced, endless conveyor belts longitudinally extending substantially the full length of said bed, said belts being transversely disposed across said bed, each belt having an upper run supported by said plate and a lower run between said plate and said bed, and conveyor actuating means operatively connected to said belts for simultaneously moving them in a common direction.

4. The combination claimed in claim 3 wherein said ribs define longitudinally extending channels, and wherein each channel houses the lower run of one of said conveyor belts.

5. In a truck having a flat cargo bed, the combination with said truck, of a portable cargo unloading mechanism, said mechanism comprising a base plate substantially coextensive with said bed and resting thereon, a support plate substantially coextensive with said base plate, a plurality of support ribs connected to said base plate and said support plate for rigidly supporting said support plate above said base plate, said support ribs extending longitudinally of said bed, a plurality of endless conveyor belts extending longitudinally of said bed substantially from one end to the other, said belts being disposed in side-by-side relationship substantially across the width of said bed, each of said belts having an upper run supported by said support plate and a lower run between said support plate and said base plate, and conveyor actuating means operatively connected to said belts for simultaneously moving them in a common direction.

6. The combination claimed in claim 5 wherein said ribs define longitudinally extending channels, and wherein each channel houses the lower run of one of said belts.

References Cited in the file of this patent

UNITED STATES PATENTS

| | | |
|---|---|---|
| 2,422,910 | Katinos | June 24, 1947 |
| 2,536,476 | Thompson | Jan. 2, 1951 |
| 2,552,953 | Gaddis | May 15, 1951 |
| 2,752,051 | Strahm et al. | June 26, 1956 |
| 2,916,169 | De Witt | Dec. 8, 1959 |

UNITED STATES PATENT OFFICE
CERTIFICATE OF CORRECTION

Patent No. 3,025,982                      March 20, 1962

William M. Quint

It is hereby certified that error appears in the above numbered patent requiring correction and that the said Letters Patent should read as corrected below.

Column 4, line 8, for "parts" read -- pairs --; line 11, before "belt" insert -- conveyor --.

Signed and sealed this 31st day of July 1962.

(SEAL)
Attest:

ERNEST W. SWIDER
Attesting Officer

DAVID L. LADD
Commissioner of Patents